US005517296A

United States Patent [19]
Choi et al.

[11] Patent Number: 5,517,296
[45] Date of Patent: May 14, 1996

[54] APPARATUS FOR DORMING A COPY OF AN ORIGINAL IMAGE ON A SHEET OF PAPER

[75] Inventors: Min-ho Choi; Kyung-hwan Kim; Byeong-sik Cheon; Jin-geun Kwak, all of Suwon-city, Rep. of Korea

[73] Assignee: Samsung Electronics Co., Ltd., Kyungki-do, Rep. of Korea

[21] Appl. No.: 319,814

[22] Filed: Oct. 7, 1994

[30] Foreign Application Priority Data

Jan. 26, 1994 [KR] Rep. of Korea .................. 94-1375
Apr. 12, 1994 [KR] Rep. of Korea .................. 94-7660

[51] Int. Cl.⁶ ................................................ G03G 15/01
[52] U.S. Cl. ...................... 355/327; 355/277; 355/326 R
[58] Field of Search .................................. 355/277, 274, 355/271, 272, 279, 208, 326 R, 326 M, 327, 328, 246

[56] References Cited

U.S. PATENT DOCUMENTS 4,063,724 12/1977 Suda .
4,615,612 10/1986 Ohno et al. .
5,014,095 5/1991 Yamada .
5,172,175 12/1992 Sekino et al. ........................ 355/277
5,303,018 4/1994 Terada et al. ..................... 355/326 R
5,347,353 9/1994 Fletcher ............................ 355/326 R
5,351,115 9/1994 Yamamoto et al. ............... 355/326 R

FOREIGN PATENT DOCUMENTS 0014661 1/1987 Japan ................................. 355/327
0127768 6/1987 Japan ................................. 355/327
0063062 3/1988 Japan ................................. 355/327

Primary Examiner—Arthur T. Grimley
Assistant Examiner—T. A. Dang
Attorney, Agent, or Firm—Leydig, Voit & Mayer

[57] ABSTRACT

An image forming apparatus includes a plurality of image forming units having a photoconductive device for forming a latent image and a developing device for developing the latent image, an exposing device for exposing the photoconductive device, and a transfer device for transferring the image developed on the photoconductive device onto a sheet of paper. The apparatus is compact and performs a stable driving because the light and small exposing device and transfer device move with respect to the plurality of image forming units, thereby providing a good-quality image and facilitating the maintenance of the apparatus.

8 Claims, 4 Drawing Sheets

APPARATUS FOR DORMING A COPY OF AN ORIGINAL IMAGE ON A SHEET OF PAPER

BACKGROUND OF THE INVENTION

The present invention relates to an image forming apparatus for forming an image received from an original document or an image signal on a sheet of paper, and more particularly, to an image forming apparatus for forming a multicolored, uncolored or monochromic image by using different-color developers.

In order to print an intended image with the image forming apparatus such as a copy machine, printer or facsimile, first, a photosensitive material is exposed according to image information obtained from an original document or a predetermined image source, thereby forming a latent image. Then, a developer (e.g., toner) sticks to the portion where the latent image is formed, in order to develop the image. The developed image is transferred and fixed on a sheet of paper.

To form a color image, usually three (or four) developers for yellow, magenta and cyan (sometimes including black) are used. Being contained in respective developing devices, different-color developers are sequentially selected, adhered to the portion of latent image of the photosensitive material, and transferred onto a sheet of paper. A color image forming apparatus with a plurality of developers respectively containing the different-color developers is divided into a fixed type and a rotary type according to the arrangement of the developing devices.

In the fixed type, a plurality of developing devices are fixedly disposed near a photoconductive drum so that a selected developing device operates to apply its developer to the photoconductive drum at its own position (see U.S. Pat. No. 4,063,724).

In the rotary type, the developing devices are radially incorporated in a rotator rotatably installed adjacent to the photoconductive drum. The rotator rotates so that the selected developing device moves to the development area of the photoconductive drum (see U.S. Pat. No. 4,615,612).

The fixed-type apparatus is unfavorable for miniaturization because a large-diameter photoconductive drum is needed to secure sufficient space for a plurality of developing devices. Further, since distances from a portion where forming of the latent image of photoconductive material starts, i.e., the portion to be exposed, to a development portion of respective developing devices, are different, the residual potential of latent image is different at respective development portions. For this reason, the density of respective colors developed is not uniform, resulting in poor picture quality.

In the rotary type apparatus, since at least one developing unit turns upside down when the rotator rotates, the developer contained therein leaks and contaminates the interior of the apparatus. This is detrimental to the maintenance of the apparatus. Moreover, a high driving torque is required to drive the rotator. Therefore, when the rotator rotates, severe vibration and loud noise are generated, which prevent stable driving. This brings about a poor picture quality.

U.S. Pat. No. 5,014,095 discloses another image forming apparatus which has a different type from the above-discussed fixed and rotary types. This image forming apparatus, as shown in FIG.1, comprises an elevation box 3 in which four developing units 2m, 2y, 2c and 2b are stacked. The box 3 is lowered or raised so that a developing unit selected on one side of photoconductive drum 1 moves to the development position of photoconductive drum 1. In this type of apparatus in which developing devices 2m, 2y, 2c and 2b are lowered or raised, the ununiformity of the image density caused due to the difference of potential of the latent image between respective developers are removed and the contamination due to the leakage of developer is prevented. However, this type of apparatus is still disadvantageous in miniaturization because sufficient space is needed for moving box 3 accommodating developing devices 2m, 2y, 2c and 2b. Further, a driving power of high torque must be used, which is a hinderance to the stable driving of the apparatus, and the enhancement of picture quality is not so effective.

SUMMARY OF THE INVENTION

Therefore, in order to overcome such problems, it is an object of the present invention to provide an image forming apparatus which is compact by optimizing the arrangement and driving mode of a plurality of developing devices.

It is another object of the present invention to provide an image forming apparatus which can be driven with a low torque to enable a stable operation.

It is still another object of the present invention to provide an image forming apparatus which eliminates problems in connection with the leakage of a developer from a plurality of developing devices.

To accomplish the objects of the present invention, there is provided an image forming apparatus for forming an image on a sheet of paper according to image information, the apparatus comprising: a plurality of image forming units having a photoconductive drum for forming a latent image by means of exposing and a developing device for containing a predetermined-color developer and developing the latent image, for providing different-color developed images; an exposing device installed to move to the position of a selected image forming unit of the plurality of image forming units and for exposing the photoconductive drum according to the image information; transfer means installed to move to the selected image forming unit and for transferring the image developed on the photoconductive drum of the selected image forming unit to the sheet of paper; and paper feeding/ejecting means for feeding the sheet of paper to the transfer means and ejecting the sheet of paper therefrom.

BRIEF DESCRIPTION OF THE DRAWING

The above objects and advantages of the present invention will become more apparent by describing in detail a preferred embodiment thereof with reference to the attached drawings in which.

DETAILED DESCRIPTION OF THE INVENTION

Preferred embodiments of the image forming apparatus of the present invention will be described below with reference to the attached drawings.

Figure 1:
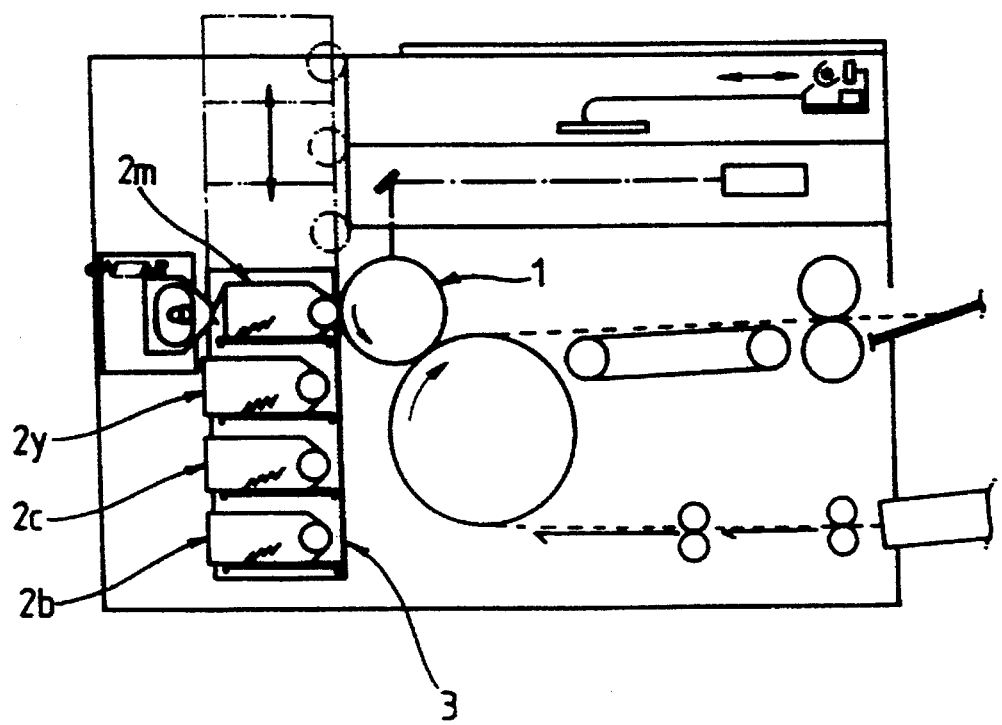
FIG. 1 is a schematic side view of a conventional image forming apparatus having movable developing units.
Figure 2:
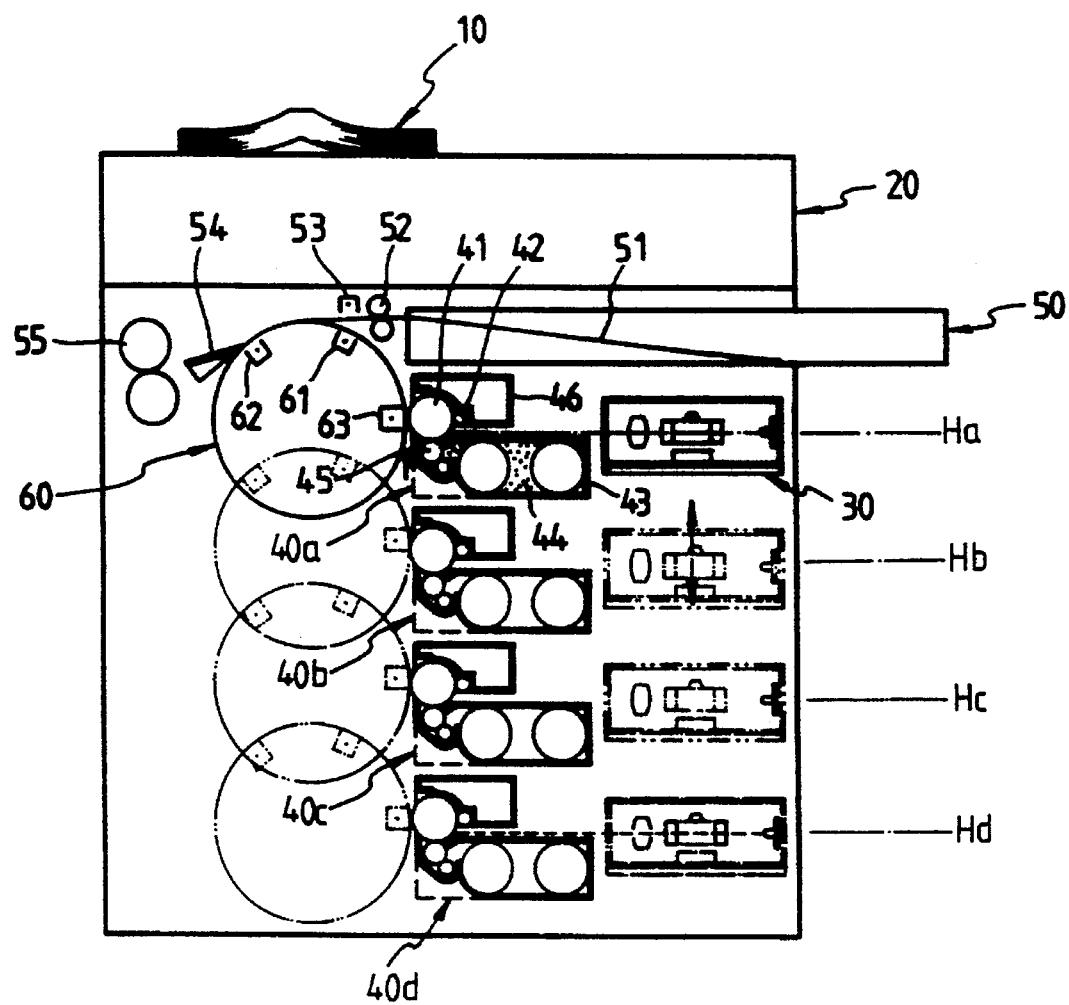
FIG. 2 is a schematic side view of an image forming apparatus of one embodiment of the present invention.

In the image forming apparatus of the present invention shown in FIG.2, reference numeral 10 indicates an original document. Reference numeral 20 is a scanning unit. Reference numeral 30 is an exposing device. Reference numerals 40a–40d are image forming units. Reference numeral 50 is a paper cassette. Reference numeral 60 is a transfer drum.

In the apparatus, scanning unit 20, a general optical device for optically scanning original document 10, outputs an electrical image signal corresponding to the image information of the scanned original document 10 and transmits the signal to exposing device 30.

Exposing device 30 is a projection optical system for projecting a laser beam according to the transmitted electrical image signal. In order to form a latent image, exposing device 30 is lowered or raised by a driving means (described later) and thereby moves to respective positions Ha–Hd of photoconductive drum 41 of a selected one of plural image forming units 40a–40d.

Each of image forming units 40a–40d includes a photoconductive drum 41, a charging roller 42 for charging photoconductive drum 41, a developing device 43 containing a developer 44 and having a developing roller 45 for developing toner 44 onto photoconductive drum 41, and a cleaner 46 for removing the remaining toner adhered on photoconductive drum 41. The four image forming units 40a–40d are stacked so as to provide a developed image of four colors, e.g., black, yellow, magenta and cyan, sequentially from the top. Initially, the surface of photoconductive drum 41 is uniformly charged by charging roller 42. An electrostatic latent image, which cannot be distinguished by the human eye, is formed on the surface portion of the photoconductive drum where the electric potential is reduced by means of exposure of exposing device 30. Developing device 43 rotates developing roller 45 so as to adsorb internally contained toner 44 onto the electrostatic latent image formed on photoconductive drum 41 and develop the electrostatic latent image, to thereby form a visible image.

Paper cassette 50 contains sheets of paper 51 and supplies one sheet of paper at a time via supply roller 52 so that the paper sheet 51 is wound around rotating transfer drum 60. The sheet of paper 51 to be supplied is charged by paper charger 53 and simultaneously therewith transfer drum 60 is charged by drum charger 61 so that the sheet of paper 51 is adsorbed on the circumference of transfer drum 60. A discharger 62, separator 54 and fixing roller 55 are constructed as an exit means in which the sheet of paper 51 bearing an image is separated from transfer drum 60 and ejected outside the apparatus, after the image is fixed onto the sheet of paper 51. Here, discharger 62 removes the remaining charges in the sheet paper 51 so that it is separated from transfer drum 60. Scraper 54 rakes across discharged sheet of paper 51 from transfer drum 60 and guides it to fixing roller 55.

Transfer drum 60 comprises a transfer charger 63 in addition to drum charger 61 and discharger 62. Transfer drum 60 is lowered or raised by the driving means so as to be brought to the height of photoconductive drum 41 contained in an image forming unit selected for transfer. Chargers 61 and 63 and discharger 62 are lowered or raised together with transfer drum 60. During paper feeding, paper discharging and transfer, transfer drum 60 rotates but chargers 61 and 63 and discharger 62 do not.

Figure 3:
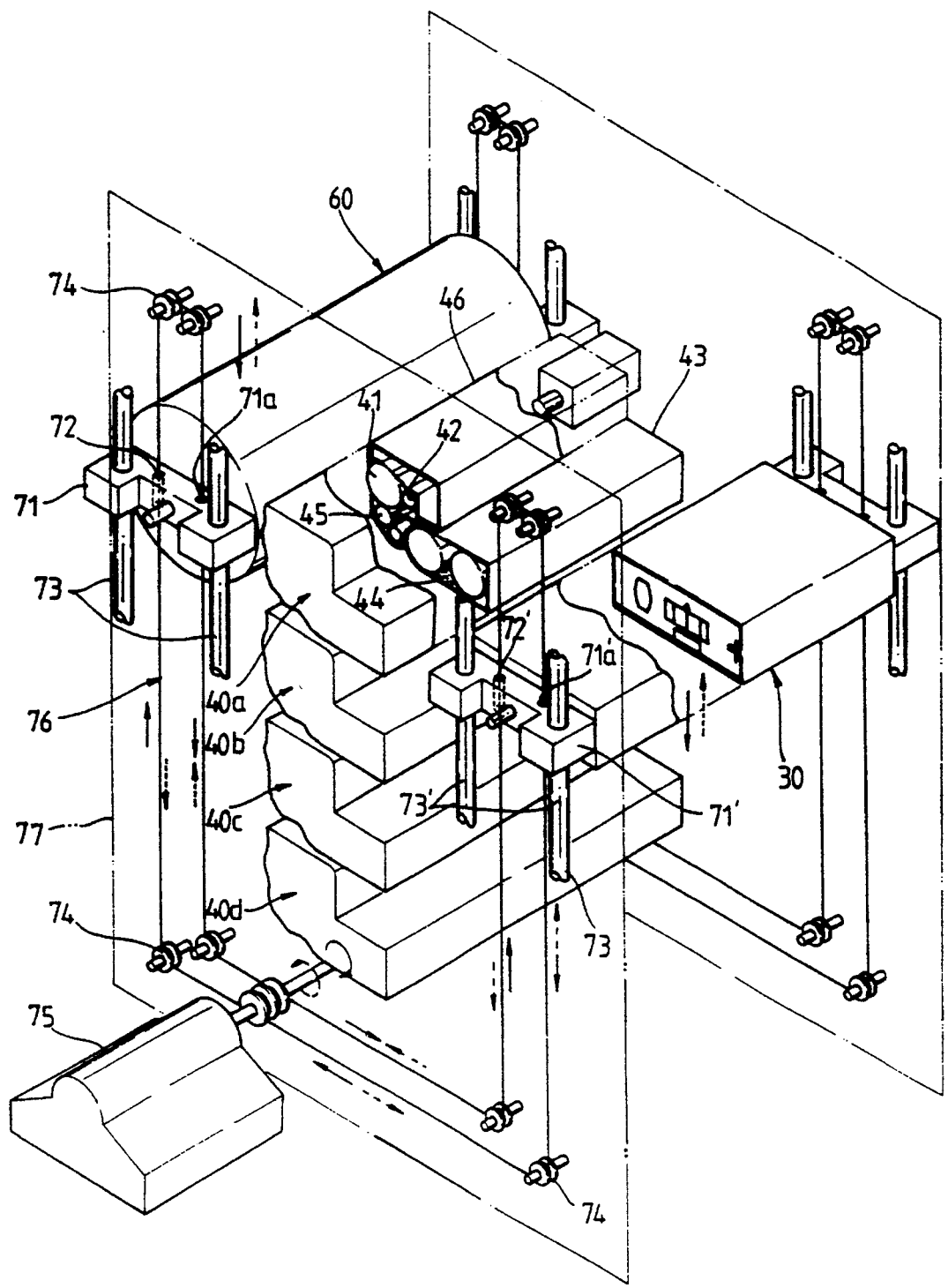
FIG. 3 is a perspective view of a specific example of a driving means for driving the exposing device and transferring means shown in FIG.2.

FIG. 3 shows an example of a driving means for lowering or raising exposing device 30 and transfer drum 60 together for the purpose of exposure and transfer.

Transfer drum 60 and exposing device 30 are supported by support members 71 and 71', respectively, which are located on the side thereof. Support members 71 and 71' are supported by guide rod members 73 and 73', respectively, so as to be vertically movable. Further, support members 71 and 71' have connection portions 71a and 71a' to which a caterpillar wire 76, fed along a plurality of guide rollers 74 and circulated by a motor 75 for driving one of the guide rollers, is fixedly connected, and holes 72 and 72' formed to allow the wire member 76 to pass through loosely. As motor 75 is driven, caterpillar wire 76 circulates in one direction so that exposing device 30 and transfer drum 60 are lowered or raised together. In the drawing, reference numeral 77 indicates a bracket on which guide rollers 74 are supported.

In the preferred image forming apparatus of the present invention, as shown in FIG. 2, exposing device 30 and transfer drum 60 are initially located at the topmost position Ha, a black toner as developer 44 is received in topmost developing device 43 of image forming unit 40a, and yellow, magenta and cyan toners are received in the other developing devices. If a black image is formed, in the state in which exposing device 30 and transfer drum 60 stay at the initial position, paper feeding, exposing, development, transfer and paper ejecting are performed sequentially.

If an image of a different color is printed, first, sheet of paper 51 is supplied from paper cassette 50 to transfer drum 60, and exposing device 30 and transfer drum 60 are shifted to a selected position according to a predetermined sequence. At the selected position, exposing, development and transfer are performed sequentially for printing. At another position, the printing is repeated for an image of an intended color. Finally, when the printing is finished, exposing device 30 and transfer drum 60 move to the topmost position Ha and the sheet of paper 51 is ejected.

In the image forming apparatus of the present invention, unicolors such as red mixed with yellow and magenta, green mixed with yellow and cyan, and blue mixed with magenta and cyan, can be printed as well as black and natural colors.

Figure 4:
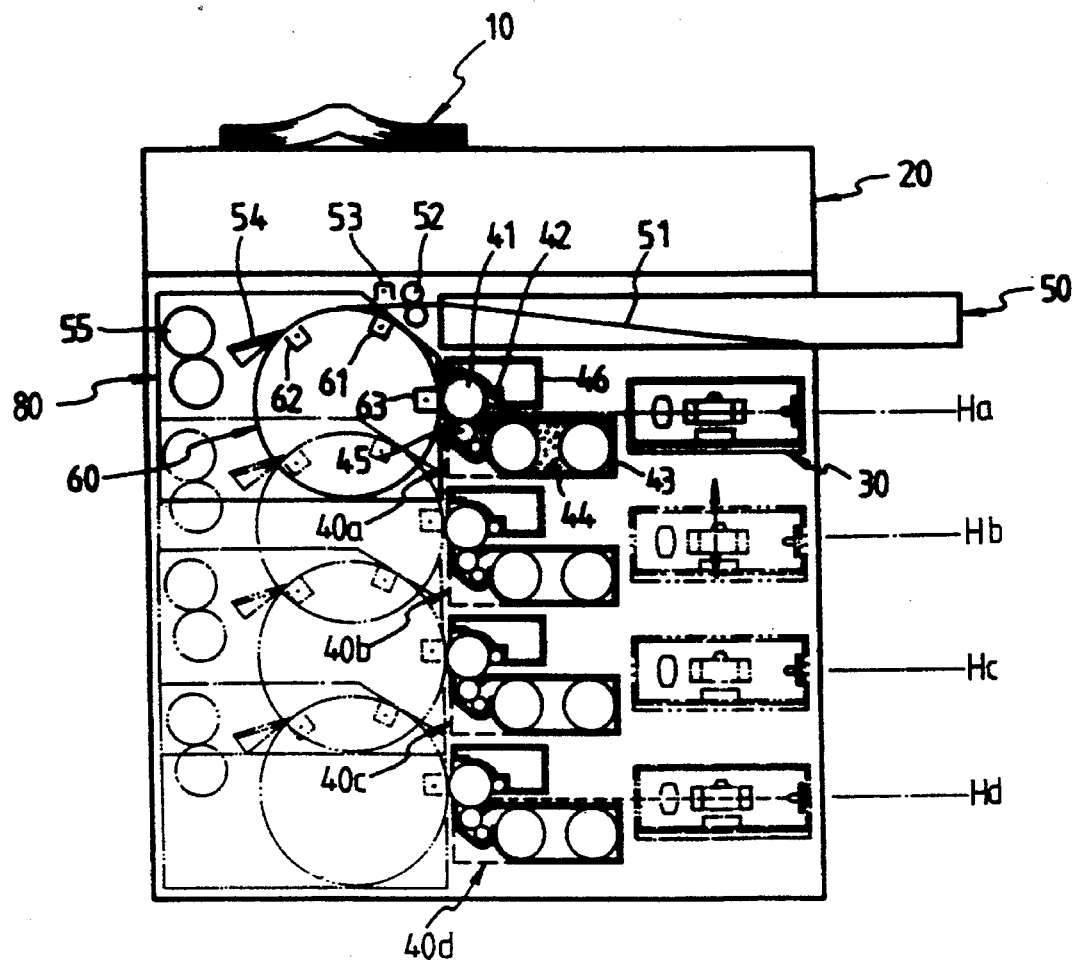
FIG. 4 is a schematic side view of another embodiment of the image forming apparatus of the present invention.

FIG.4 illustrates a second embodiment of the image forming apparatus of the present invention, which further comprises a housing 80 lowered or raised with transfer drum 60, scraper 54 and fixing roller 55 accommodated thereinside. This embodiment is similar to the first embodiment in that housing 80 moves to the topmost position Ha for the purpose of paper feeding. However, since housing 80 can eject sheet of paper at any position, there is no need to move the housing to the topmost position Ha for paper ejecting. After printing, paper ejecting is performed directly at the current position, thereby supplying the image-bearing sheet of paper more rapidly to the user.

As described above, the image forming apparatus of the present invention is compact because it is constructed so that the four large developing devices are fixed and the relatively small exposing device and transfer device are shifted. The weight of the exposing device and transfer device enables relatively stable driving, resulting in yielding a good quality image. Further, since the four image forming units are fixed, there is no problem with developer leakage. Furthermore, the respective image forming units can be replaced individually, facilitating the maintenance of the apparatus such as the replenishing of developer.

What is claimed is:

1. An image forming apparatus for forming an image on a sheet of paper comprising:

a plurality of stationary image forming units, each image forming unit having a photoconductive drum for forming a latent image by exposure and a developing device for containing a respective color developer for developing the latent image, thereby providing different color developed images;

an exposing device, movable to a selected image forming unit of said plurality of image forming units, for, at the selected image forming unit, exposing said photoconductive drum to image information;

transfer means, movable to the selected image forming unit, for transferring an image developed on said photoconductive drum at the selected image forming unit to a sheet of paper;

driving means for driving said exposing device and said transfer means so that said exposing device and said transfer means move together to respective image forming units; and paper feeding and ejecting means for feeding the sheet of paper to said transfer means and for ejecting the sheet of paper.

2. The image forming apparatus as claimed in claim 1, wherein said driving means comprises:

support members respectively supporting said exposing device and transfer means;

guide rod members respectively guiding said support members so that said support members are lowered or raised, a plurality of guide rollers;

a caterpillar wire fed along said plurality of guide rollers and connected to said support members; and a motor for driving at least one of said plurality of guide rollers.

3. The image forming apparatus as claimed in claim 1, wherein each of said plurality of image forming units includes a charging roller for charging said photoconductive drum and cleaning means for removing developer form said photoconductive drum.

4. The image forming apparatus as claimed in claim 1, further comprising a scanning device for scanning an image of an original document to produce an electrical signal corresponding to the image and transmitting the electrical signal to said exposing device.

5. The image forming apparatus as claimed in claim 1, wherein said transfer means comprises:

a rotatable transfer drum driven adjacent to said photoconductive drum of the selected image forming unit, for winding the sheet of paper supplied from said paper feeding means around said transfer drum;

a drum charger for electrically charging said transfer drum so that the sheet of paper is adhered to said transfer drum;

a discharger for removing electrical charge from said transfer drum; and a transfer charger for transferring an image developed on said photoconductive drum to the sheet of paper adhered to said transfer drum.

6. The image forming apparatus as claimed in claim 1, wherein said paper feeding and ejecting means comprises:

a paper cassette for retaining sheets of paper;

a supply roller for drawing a sheet of paper from said paper cassette and feeding the sheet of paper to said transfer means;

a paper charger for electrically charging sheet of paper supplied by said supply roller;

a scraper for raking the sheet of paper to separate the sheet of paper from said transfer means; and a fixing roller for fixing an image transferred to the sheet of paper while ejecting the sheet of paper raked by said scraper.

7. The image forming apparatus as claimed in claim 6, wherein said separator and fixing roller of said paper feeding and ejecting means move together with said transfer means.

8. An image forming apparatus for forming an image on a sheet of paper comprising:

a plurality of stationary image forming units, each image forming unit having a photoconductive drum for forming a latent image by exposure and a developing device for containing a respective color developer for developing the latent image, thereby providing different color developed images;

an exposing device, movable to a selected image forming unit of said plurality of image forming units for, at the selected image forming unit, exposing said photoconductive drum to image information;

transfer means, movable to the selected image forming unit, for transferring an image developed on said photoconductive drum at the selected image forming unit to a sheet of paper;

paper feeding means for feeding the sheet of paper to said transfer means;

paper ejecting means for ejecting the sheet of paper from said transfer means at a position to which said transfer means is moved; and a housing accommodating said transfer means and said paper ejecting means and moving said transfer means and said paper ejecting means to respective image forming means together.

* * * * *

UNITED STATES PATENT AND TRADEMARK OFFICE
CERTIFICATE OF CORRECTION

PATENT NO. : 5,517,296
DATED : May 14, 1996
INVENTOR(S) : Shimada

It is certified that error appears in the above-indentified patent and that said Letters Patent is hereby corrected as shown below: On title page, item [54] and col. 1, line 1,
In the title: change "Dorming" to --Forming--;

Column 5, Line 27, change "," to --;--;

Line 37, change "form" to --from--;

Column 6, Line 34, after "units" insert --,--.

Signed and Sealed this

Thirteenth Day of August, 1996

Attest:

BRUCE LEHMAN

Attesting Officer           Commissioner of Patents and Trademarks